(12) United States Patent
Crews et al.

(10) Patent No.: US 9,938,448 B2
(45) Date of Patent: Apr. 10, 2018

(54) DUAL-FUNCTION NANO-SIZED PARTICLES

(71) Applicant: BAKER HUGHES INCORPORATED, Houston, TX (US)

(72) Inventors: James B. Crews, Willis, TX (US); Tianping Huang, Spring, TX (US); Othon Monteiro, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 15/599,208

(22) Filed: May 18, 2017

(65) Prior Publication Data
US 2017/0253789 A1   Sep. 7, 2017

Related U.S. Application Data

(60) Division of application No. 15/392,533, filed on Dec. 28, 2016, now Pat. No. 9,676,990, which is a division of application No. 12/818,927, filed on Jun. 18, 2010, now Pat. No. 9,540,562, which is a continuation-in-part of application No. 11/931,706, filed on Oct. 31, 2007, now abandoned, and a continuation-in-part of application No. 11/849,820, filed on Sep. 4, 2007, now Pat. No. 8,278,252, which is a continuation-in-part of application No. 11/125,465, filed on May 10, 2005, now Pat. No. 7,343,972, said application No. 11/849,820 is a continuation-in-part of application No. 11/755,581, filed on May 30, 2007, now Pat. No. 7,550,413.

(60) Provisional application No. 60/845,916, filed on Sep. 20, 2006, provisional application No. 60/570,601, filed on May 13, 2004, provisional application No. 60/815,693, filed on Jun. 22, 2006.

(51) Int. Cl.
| | |
|---|---|
| *C09K 8/64* | (2006.01) |
| *C09K 8/516* | (2006.01) |
| *C09K 8/565* | (2006.01) |
| *C09K 8/57* | (2006.01) |
| *C09K 8/80* | (2006.01) |
| *E21B 47/10* | (2012.01) |
| *E21B 43/267* | (2006.01) |
| *E21B 43/04* | (2006.01) |
| *E21B 43/14* | (2006.01) |
| *C09K 8/66* | (2006.01) |

(52) U.S. Cl.
CPC ............. *C09K 8/516* (2013.01); *C09K 8/565* (2013.01); *C09K 8/572* (2013.01); *C09K 8/64* (2013.01); *C09K 8/665* (2013.01); *C09K 8/805* (2013.01); *E21B 43/04* (2013.01); *E21B 43/14* (2013.01); *E21B 43/267* (2013.01); *E21B 47/1015* (2013.01); *C09K 2208/10* (2013.01)

(58) Field of Classification Search
CPC ...... C09K 2208/10; C09K 8/50; C09K 8/516; C09K 8/665; C09K 8/68; C09K 8/805; E21B 43/14; E21B 43/25; E21B 43/267; E21B 47/1015
See application file for complete search history.

(56) References Cited

U.S. PATENT DOCUMENTS

| | | | |
|---|---|---|---|
| 4,235,728 | A | 11/1980 | Schulz et al. |
| 4,572,297 | A | 2/1986 | Thigpen, Jr. et al. |
| 4,931,195 | A | 6/1990 | Cao et al. |
| 4,944,985 | A | 7/1990 | Alexander et al. |
| 5,489,449 | A | 2/1996 | Umeya et al. |
| 5,518,996 | A | 5/1996 | Maroy et al. |
| 5,964,295 | A | 10/1999 | Brown et al. |
| 6,211,120 | B1 | 4/2001 | Welch et al. |
| 6,258,859 | B1 | 7/2001 | Dahayanake et al. |
| 6,605,570 | B2 | 8/2003 | Miller et al. |
| 6,613,720 | B1 | 9/2003 | Feraud et al. |
| 7,060,661 | B2 | 6/2006 | Dobson et al. |

(Continued)

FOREIGN PATENT DOCUMENTS

WO    2008036812 A2    3/2008

OTHER PUBLICATIONS

J. Hibbeler, et al., "An integrated Long-Term Solution for Migratory Fines Damages," SPE 81017, SPE Latin American and Caribbean Petroleum Engineering Conference, Apr. 27-30, 2003, pp. 1-11, Port-of-Spain, Trinidad; West Indies.

P.D. Nguyen, et al., "Controlling Formation Fines at Their Sources to Maintain Well Productivity," SPE 97659, SPE International Improved Oil Recovery Conference in Asia Pacific, Kuala Lumpur, Dec. 5-6, 2005; republished SPE Production & Operations, May 2007, pp. 202-215.

C. H. Bivins, et al., "New Fibers for Hydraulic Fracturing," Oilfield Review, Summer 2005, pp. 34-43.

(Continued)

*Primary Examiner* — Alicia Bland
(74) *Attorney, Agent, or Firm* — Mossman, Kumar & Tyler, P.C.

(57) ABSTRACT

Dual-function nano-sized particles or nanoparticles may be effective at fixating or reducing fines migration and they may facilitate identification of a particular zone in a well having more than one zone. In some embodiments the dual-function nanoparticles are tagged with a detectable material that is distinguishable from the composition of the primary nanoparticle component. In these embodiments, the taggant material rather than the primary component of the nanoparticles may be used to enable identification of a particular zone. The nanoparticles (with or without taggant) may be added to a treatment fluid containing carrier particles such as proppant. The treatment fluid is pumped downhole to one of the zones; each zone receiving its own unique or uniquely-tagged nanoparticles. Should one of the zones fail, the composition of the nanoparticles (or its taggant) produced on the carrier particles may be correlated to the zone from which it was received, and hence produced.

8 Claims, No Drawings

(56) References Cited

U.S. PATENT DOCUMENTS

| | | |
|---|---|---|
| 7,081,439 B2 | 7/2006 | Sullivan et al. |
| 7,125,825 B2 | 10/2006 | Moss |
| 7,131,491 B2 | 11/2006 | Blauch et al. |
| 7,204,311 B2 | 4/2007 | Welton et al. |
| 7,207,388 B2 | 4/2007 | Samuel et al. |
| 7,258,170 B2 | 8/2007 | Nguyen et al. |
| 7,265,079 B2 | 9/2007 | Willberg et al. |
| 7,343,972 B2 | 3/2008 | Willingham et al. |
| 7,527,102 B2 | 5/2009 | Crews et al. |
| 7,543,644 B2 | 6/2009 | Huang et al. |
| 7,543,646 B2 | 6/2009 | Huang et al. |
| 7,544,643 B2 | 6/2009 | Huang |
| 7,550,413 B2 | 6/2009 | Huang et al. |
| 7,632,355 B2 | 12/2009 | Toth |
| 7,721,803 B2 | 5/2010 | Huang et al. |
| 2003/0196799 A1 | 10/2003 | Nguyen et al. |
| 2003/0234103 A1 | 12/2003 | Lee et al. |
| 2004/0106525 A1 | 6/2004 | Willberg et al. |
| 2004/0137209 A1 | 7/2004 | Zeller et al. |
| 2004/0152601 A1 | 8/2004 | Still et al. |
| 2005/0107265 A1 | 5/2005 | Sullivan et al. |
| 2005/0252658 A1 | 11/2005 | Willingham et al. |
| 2006/0113080 A1 | 6/2006 | Nguyen et al. |
| 2006/0193978 A1 | 8/2006 | Toth |
| 2007/0209794 A1 | 9/2007 | Kaufman et al. |
| 2008/0210421 A1 | 9/2008 | Wilson et al. |
| 2009/0107673 A1* | 4/2009 | Huang .................. C09K 8/516 166/280.2 |
| 2009/0111728 A1 | 4/2009 | De Block |
| 2009/0312201 A1 | 12/2009 | Huang et al. |

OTHER PUBLICATIONS

G. Navaira, et al., "A Novel Technique for Determining Screen Failure in Offshore Wells: A GOM Case History," SPE 112084, SPE Drilling & Completions, vol. 24, No. 3, Sep. 2009, pp. 436-440.

Suh, Seige, et al., "Chemical Vapor Deposition of Cerium Oxide Films from a Cerium Alkoxide Precursor," Chem. Mater. 2004, 16, 1667-1673.

\* cited by examiner

DUAL-FUNCTION NANO-SIZED PARTICLES

CROSS-REFERENCES TO RELATED APPLICATIONS

This application is a divisional application of U.S. Ser. No. 15/392,533 filed Dec. 28, 2016, which is a divisional application of U.S. Ser. No. 12/818,927 filed Jun. 18, 2010, issued Jan. 10, 2017 as U.S. Pat. No. 9,540,562, which is a continuation-in-part application of U.S. Ser. No. 11/931,706 filed Oct. 31, 2007 and U.S. Ser. No. 11/849,820 filed Sep. 4, 2007, the latter which claims the benefit of U.S. Provisional Patent Application 60/845,916 filed Sep. 20, 2006, and in turn is a continuation-in-part application of U.S. Ser. No. 11/125,465 filed May 10, 2005, issued Mar. 18, 2008, as U.S. Pat. No. 7,343,972 which in turn claims the benefit of U.S. Provisional Patent Application 60/570,601 filed May 13, 2004 and is a continuation-in-part application of U.S. Ser. No. 11/755,581 filed May 30, 2007, issued Jun. 23, 2009 as U.S. Pat. No. 7,550,413, which in turn claims the benefit of U.S. Provisional Application No. 60/815,693 filed Jun. 22, 2006.

TECHNICAL FIELD

Non-limiting embodiments as described herein relate to methods and compositions utilizing dual-function nano-sized particles, and more particularly relate, in non-limiting embodiments, to methods and compositions using nano-sized particles effective at reducing fines migration within subterranean formations, and if there is undesired flow back from one or more zones in a well having more than one zone, identifying the zone or zones from which the undesired flow back originated, or both during hydrocarbon recovery operations.

BACKGROUND

Hydrocarbons sometimes exist in reservoirs in subterranean rock formations. Generally, to produce the hydrocarbons from the formation, a wellbore is drilled in the formation and hydrocarbons travel from the formation to the wellbore through pores in the formation. The better the connectivity of the pores in the formation (permeability), the better the hydrocarbon production.

Production may be seriously hindered by blockages due to presence of or migration of fines in the formation. The migration of fines involves the movement of fine clay and/or non-clay particles (e.g. quartz, amorphous silica, feldspars, zeolites, carbonates, salts and micas) or similar materials within a subterranean reservoir formation due to drag and other forces during production of hydrocarbons or water. Fines migration may result from an unconsolidated or inherently unstable formation, or from the use of an incompatible treatment fluid that liberates fine particles. Fines migration may cause the very small particles suspended in the produced fluid to bridge the pore throats near the wellbore, thereby reducing well productivity. Damage created by fines is typically located within a radius of about 3 to 5 feet (about 1 to 2 meters) of the wellbore, and may occur in gravel-pack completions and other operations.

Fines migration is a complex phenomenon governed largely by mineralogy, permeability, salinity and pH changes, as well as drag forces created by flow velocity, turbulence and fluid viscosity, as described in detail in J. Hibbeler, et al., "An Integrated Long-Term Solution for Migratory Fines Damage," SPE 81017, SPE Latin American and Caribbean Petroleum Engineering Conference, Port-of-Spain, Trinidad, West Indies, 27-30 Apr. 2003, incorporated herein by reference in its entirety. The authors note that mobilization of fines can severely damage a well's productivity, and that fines damage is a multi-parameter, complex issue that may be due to one or more of the following downhole phenomena: (1) high flow rates, particularly abrupt changes to flow rates; (2) wettability effects, (3) ion exchange; (4) two-phase flow, particularly due to turbulence that destabilize fines in the near-wellbore region; and (5) acidizing treatments of the wrong type or volume which can cause fines.

J. Hibbeler, et al. note that fines, especially clays, tend to flow depending on their wettability, and since fines are typically water-wet, the introduction of water may trigger fines migration. However, they note that clay particles may become oil-wet or partially oil-wet, due to an outside influence, and thus the fines and clay particles may become attracted to and immersed in the oil phase. The authors also note that all clays have an overall negative charge and that during salinity decrease, pH increases in-situ due to ion exchange. A pH increase may also be induced via an injected fluid. As pH increases, surface potential of fines increases until de-flocculation and detachment occurs, aggravating fines migration.

Fines fixation has become troublesome during oil and gas production and during many oil and gas recovery operations, such as acidizing, fracturing, gravel packing, and secondary and tertiary recovery procedures. Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

Gravel packing is a sand-control method employed to prevent the production of formation sand. In gravel pack operations, a steel screen is placed in the wellbore and the surrounding annulus packed with a gravel of a specific size designed to prevent the passage of formation sand. The goal is to stabilize the formation while causing minimal impairment to well productivity. Operations combining fracturing and gravel packing are termed "frac packs".

Hydraulic fracturing, gravel packing, and/or frac pack treatments may fail such that proppant, gravel, or both are produced into the well. If the proppant, for example, flows back into the well it cannot keep the fracture propped open. This type of failure may be repaired or remediated if the engineers know where the failure occurred in the well. This may be easy enough if the well has only one zone such as a fracture zone, but if the well has more than one zone, it is typically difficult to determine which zone failed.

Thus, it would be desirable if methods and/or compositions would be devised to help identify a failed zone in a well having more than one zone using material that are also effective at fixing or stabilizing fines within a subterranean formation so that their migration is reduced, inhibited or eliminated.

SUMMARY

In a non-limiting aspect, a method is provided that includes determining which zone in a well having more than one treatment-based zone carrier particles were produced from. The carrier particles have nano-sized particles disposed thereon, and the nano-sized particles are effective to reduce fines migration in a subterranean formation and have a mean particle size of 1000 nm or less; a primary component selected from the group consisting of alkaline earth metal oxides, alkaline earth metal hydroxides, transition metal oxides, transition metal hydroxides, post-transition metal oxides, post-transition metal hydroxides, piezoelectric crystals, pyroelectric crystals, and mixtures thereof. The composition of the nano-sized particles is indicative of the zone from which the carrier particles were produced. In some non-limiting embodiments, the nano-sized particles also include a detectable taggant selected from the group consisting of alkaline earth metals, transition metals, post-transition metals, lanthanoids, and mixtures thereof. The selected taggant is selected to be distinguishable from the primary component and to be indicative of one of the more than one zone.

In another non-limiting aspect, a treatment fluid is provided that comprises a base fluid selected from the group consisting of water-based fluids, alcohol-based fluids and oil-based fluids. The treatment fluid also comprises carrier particles selected from the group consisting of sand, gravel, ceramic beads, glass beads, and combinations thereof, and an effective amount of a particulate additive to reduce fines migration and to facilitate identification of a zone in a well having more than one treatment-based zone. The particulate additive has a mean particle size of 1000 nm or less; a primary component selected from the group consisting of alkaline earth metal oxides, alkaline earth metal hydroxides, transition metal oxides, transition metal hydroxides, post-transition metal oxides, post-transition metal hydroxides, piezoelectric crystals, pyroelectric crystals, and mixtures thereof; and a taggant selected from the group consisting of alkaline earth metals, transition metals, post-transition metals, lanthanoids; and mixtures thereof, where the taggant is selected to be distinguishable from the primary component.

In an additional non-limiting aspect, coated carrier particles are provided. The coated carrier particles comprise carrier particles selected from the group consisting of sand, gravel, ceramic beads, glass beads, and combinations thereof; nanoparticles disposed on the carrier particles with a coating agent. The nanoparticles have a mean particle size of 1000 nm or less; a primary component selected from the group consisting of alkaline earth metal oxides, alkaline earth metal hydroxides, transition metal oxides, transition metal hydroxides, post-transition metal oxides, post-transition metal hydroxides, piezoelectric crystals, pyroelectric crystals, and mixtures thereof; and a taggant selected from the group consisting of alkaline earth metals, transition metals, post-transition metals, lanthanoids, and mixtures thereof; where the taggant is selected to be distinguishable from the primary component.

In yet another non-limiting aspect, a method for reducing fines migration within a subterranean formation and for distinguishing between zones in a well having more than one treatment-based zone is provided. The well is drilled in the subterranean formation. Each zone in the well receives carrier particles that carry an amount of nano-sized particles effective to reduced fines migration in the subterranean formation. The nano-sized particles have a mean particle size of 1000 nm or less, are selected from the group consisting of alkaline earth metal oxides, alkaline earth metal hydroxides, transition metal oxides, transition metal hydroxides, post-transition metal oxides, post-transition metal hydroxides, piezoelectric crystals, pyroelectric crystals, and mixtures thereof. The carrier particles received in each zone of the well include nano-sized particles that are chemically unique to that zone.

The particulate additive, also referred to herein as nano-sized particles or nanoparticles may fixate or flocculate fines, such as clay and non-clay particles to keep or restrict or reduce the fine particles from moving in, for example, a propped hydraulic fracture in a subterranean formation. In this non-limiting example, the nano-sized particles, which coat on the proppant particles, may bind or fix the fines to the proppant particles, such as 20/40 mesh ceramic proppants, so that both the formation fines and the nanoparticles remain on the proppant particles and do not travel or are restrained to the point that fine migration damage to the near-wellbore region is minimized.

Should for some reason carrier particles placed during a treatment, such as proppant within a fracture hydraulic fracturing, be produced or flow back into the wellbore they may be detected via the composition of the nano-size particulate additive and/or via a traceable taggant that may be incorporated into the body of the nano-size particulate additive, coated thereon, or both. Detecting such nanoparticles is useful in situations where a well has more than one zone, such as sequential multi-stage fracturing treatments in horizontally completed shale or tight gas completions. For instance, for each zone in the well, fines-fixing nanoparticles are introduced into the zone, where the nano-sized particles may carry a detectable taggant that is unique to that zone and/or the nano-sized particle itself may be unique to that zone. And if the nano-sized particles from one or more of the zones should flow back into the wellbore on produced proppant particles (or other carrier particle), a sample of the produced proppant containing the uniquely-tagged and/or unique nanoparticles may be analyzed to determine the identity of the nanoparticle(s)/taggant(s). Since the nano-sized particles for each zone may carry a unique taggant and/or may themselves be unique, the zone from which the nanoparticles were produced may be determined.

DETAILED DESCRIPTION

Fines migration has been troublesome during oil and gas production, as well as during many oil and gas recovery operations including, but not necessarily limited to, acidizing, fracturing, gravel packing, secondary and tertiary recovery operations, and the like. As discussed in SPE 81017 referred to above, most of the fines that migrate and cause damage have a charge, and most clay particles generally have an overall negative charge. As defined herein, fines (i.e. formation fines) are naturally occurring particles having particle size less than 37 microns (μm).

Nano-sized particles like magnesium oxide (MgO) may be used to fixate formation fines such as clay and quartz in subterranean hydrocarbon formations to inhibit, restrain, or prevent the fines from migrating to near-wellbore regions to damage production of the hydrocarbons. Some nano-sized particles, also called nanoparticles herein, not only have high surface areas compared to their small sizes, but also have relatively high surface charges that permit them to associate or connect other particles together, including other charged particles, but also other non-charged particles. In one non-limiting embodiment, these associations or connections between the fines and the nano-sized particles are due to electrical attractions and other intermolecular forces or effects.

In addition to fines migration being troublesome during oil and gas production and/or recovery operations, one or more of these operations may periodically fail. For instance, operations such as fracturing, gravel packing, and frac-packing may fail allowing undesired flow back or production of carrier particles such as proppant or gravel particles into the wellbore from, for example, the hydraulic fracture in the formation. As such, the intended treatment may not be effective and the produced proppant or gravel or the like may cause additional damage such as to the equipment.

Matters are further complicated if a well has more than one zone. In one non-limiting example, the subterranean formation proximate a wellbore may be treated with more than one fracture treatment, each fracture area corresponding with a zone. These types of zones may be formed in a sequence where one zone is hydraulically fractured, and once completed another zone is hydraulically fractured and completed, the pattern repeating until all frac jobs for the particular well are finished. Such zones may be termed "fracture-based zones". One example of a fracture completion system is FRAC-POINT™, which is available from Baker Hughes Incorporated. Embodiments, however, are not limited to the forgoing example, and zones are not limited to fracture-based zones—they may be characterized by any type of interval, such as without limitation gravel pack and frac-pack based zones. If there is a failure in a dual or multi-zonal well it may be very difficult to determine which zone failed.

The nano-sized particles used to fixate formation fines and inhibit, restrain, or prevent such fines from migrating may also be used to identify a defective zone in a well having more than one zone. For instance, nanoparticles may be disposed on carrier particles such as proppant, sand, gravel, and the like. The nanoparticles may or may not be tagged with a detectable material. In embodiments where the nano-sized particles do not include taggant material, each zone receives proppant carrying nanoparticles with a chemical make-up that is distinct for that zone. Similarly, in embodiments where the nano-sized particles include a taggant material, each zone receives proppant carrying tagged nanoparticles where the taggant received in each zone is chemically distinct from that received in the other zone or zones. Thus, the nanoparticles may be used to fix formation fines and the chemical composition of the nanoparticles, the taggant, or both may be used as an identifier. In a simplified, non-limiting example, proppant having one type of dual-function nanoparticles disposed thereon may be suspended in a base fluid and be pumped downhole to the zone being treated. Another, different zone may be treated in the same way except the proppant carries another, different type of dual-function nanoparticles and/or taggant material to the other downhole zone. While in the fractures, the nanoparticles fixate formation fines onto proppant particles. But should one or both of the zones fail for some reason (e.g. produce proppant from the hydraulic fracture), the proppant produced into the well may be analyzed to determine which nanoparticle(s), taggant(s), or both are present on the proppant. The identity of such nanoparticle(s) and/or taggant(s) on produced proppant may then be used to determine which zone or zones they were produced from, hence where the failure(s) occurred. That is, dual-function nanoparticles (e.g. produced on proppant) may be chemically analyzed to provide information about their constituents, including the taggant if present. Since nanoparticles and/or taggants can be chemically differentiated, and chemically distinct nanoparticles and/or taggants will be used in different zones, chemical analysis of the nano-sized particles and/or taggants can facilitate identification of the zone from which they originated. The nanoparticles are believed to provide both functions without damage to subterranean formations.

To analyze the composition of nanoparticles, taggant, or both, a sample containing produced proppant may be obtained. It is expected that samples will usually come from reservoir fluids, such as hydrocarbons, containing solids, such as proppant, that are produced to the surface. Alternatively, and without limitation, produced proppant samples may be obtained by mechanical sampling such as via a downhole wireline with a solids removal tool at the end, or by using a viscosified fluid to sweep out the wellbore. Generally, to sweep out the wellbore, a viscous pill is pumped from the surface using the existing tubing or a coiled tubing to wash out a wellbore. Regardless of how the proppant (or other carrier particle) sample is obtained, it may be analyzed by any suitable detection method such as, without limitation, inductively-coupled plasma (ICP), X-ray fluorescence (XRF), x-ray diffraction (XRD), and proton-induced X-ray emission.

Chemically, nano-sized particles or nanoparticles may be comprised of metal oxides and/or hydroxides. For example, dual-function nanoparticles may be comprised of materials selected from the group consisting of alkaline earth metal oxides, alkaline earth metal hydroxides, transition metal oxides, transition metal hydroxides, post-transition metal oxides, post-transition metal hydroxides, and mixtures thereof. Embodiments, however, are not limited to metal oxides and/or hydroxides; piezoelectric crystals and pyroelectric crystals are also suitable materials from which nanoparticles may be produced.

Magnesium oxide is a suitable material for making dual-function nanoparticles. Magnesium oxide particles and powders are but one example of a suitable alkaline earth metal oxide and/or alkaline earth metal hydroxide particle. Other suitable alkaline earth metal oxides and/or hydroxides include elements in Group IIA of the previous IUPAC American Group notation, including without limitation, calcium (Ca), strontium (Sr), and barium (Ba).

Dual-function nanoparticles may also comprise oxides and/or hydroxides of one or more "post-transition" metals such as without limitation aluminum (Al), gallium (Ga), indium (In), tin (Sn), thallium (Tl), lead (Pb), and bismuth (Bi). In another non-limiting embodiment, nano-sized particles may be oxides and/or hydroxides of elements of Groups IIB and IIIB of the previous IUPAC American Group notation. These elements include, but are not necessarily limited to, titanium (Ti), zirconium (Zr), cobalt (Co), nickel (Ni) and/or zinc (Zn). Non-limiting examples of such suitable oxides include zinc oxide (ZnO), zirconium dioxide ($ZrO_2$), titanium dioxide ($TiO_2$), cobalt (II) oxide (CoO), and/or nickel (II) oxide (NiO).

Dual-function nano-sized particles may also be comprised of piezoelectric crystal particles (which include pyroelectric crystal particles). Pyroelectric crystals generate electrical charges when heated and piezoelectric crystals generate electrical charges when squeezed, compressed, or pressed. In one non-limiting embodiment, specific suitable piezoelectric crystal particles may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. The total pyroelectric coefficient of ZnO is $-9.4$ $C/m^2K$. ZnO and these other crystals are generally not water soluble.

In one non-limiting explanation, when very small pyroelectric crystals, such as nano-sized ZnO, are added to a base fluid, which is then pumped downhole into underground formations that are under high temperature and/or pressure, the pyroelectric crystals are heated and/or pressed and high surface charges are generated. These surface charges permit the crystal particles to associate, link, connect or otherwise relate the formation fines together to fixate them together and also to the carrier particles.

It should be noted that dual-function nanoparticles may be used alone or in combinations or mixtures. For instance and without limitation, the alkaline earth metal oxides and hydroxides, may be used alone or in combination with one or more transition metal oxide, transition metal hydroxide, post-transition metal oxide, post-transition metal hydroxide, piezoelectric crystal, and pyroelectric crystal.

In some embodiments the dual-function nano-sized particles may be tagged with a taggant material. For nanoparticles of a given composition, the associated taggant should be distinguishable from the nanoparticle primary component. As a non-limiting example, the primary component of the dual-function nanoparticles may be a mixture of different oxide phases, such as MgO, CaO, $SiO_2$, $Al_2O_3$ and the like, the majority of which being MgO. The exact choice of taggant for association with such primary component could also be an oxide phase albeit one with a composition distinguishable from other phases that may be part of the system.

It is believed that suitable taggants may be selected from the group consisting of alkaline earth metals, transition metals, post-transition metals, lanthanoids, and mixtures thereof. Of the alkaline earth metals, Sr and Ba are two non-limiting examples of suitable taggants. Non-limiting examples of suitable transition metal taggants include scandium (Sc), yttrium (Y), Ti, Zr, hafnium (Hf), vanadium (V), niobium (Nb), tantalum (Ta), molybdenum (Mo), tungsten (W), manganese (Mn), rhenium (Re), iron (Fe), ruthenium (Ru), osmium (Os), Co, rhodium (Rh), iridium (Ir), Ni, palladium (Pd), platinum (Pt), copper (Cu), silver (Ag), gold (Au), Zn, cadmium (Cd), and mixtures thereof. Of the post-transition metals a taggant may be selected, without limitation, from the group consisting of: Al, Ga, In, Th, germanium (Ge), Sn, Pb, arsenic (As), antimony (Sb), Bi, selenium (Se), tellurium (Te), and mixtures thereof. Furthermore, lanthanoid-based taggants may be selected from the group consisting of: lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and mixtures thereof.

One or more taggants may be included with, added to, or coated on the primary component of the nanoparticles. Although taggant may occur in elemental form, it is more likely that the taggants occur as compounds. Non-limiting examples of potential types of compounds include fluorides, chlorides, bromides, nitrates, nitrides, iodates, oxides, hydroxides, carbonates, sulfates, sulfides, phosphates, silicates, alkoxides, organic acids such as manganese gluconate, and combinations thereof. It should be noted that the taggant may not remain in its original form; it may be modified such as during processing. For example, during coating processes the taggant may be modified by a reducing agent, changed during vapor phase for deposition, or altered by interacting with a liquid phase if slurried or dissolved.

In some non-limiting embodiments, taggant may be added during manufacture of nano-sized particles. For instance, the taggant may be continuously distributed along the entire nano-sized particle. In a non limiting example, Zn, or a zinc compound, may be added to a solution from which MgO nano-sized particles are produced so that the end product consists of Zn doped MgO. Nano-sized particles of similar composition may also be produced by using vapor phase processes.

In other non-limiting embodiments, the nanoparticles manufacturing process may consist of two of more sequential steps resulting in core-shell structure. For instance, the taggant material may form the core of the nanoparticles, which has a structure consisting of a core and an outer layer of a different material such as the primary component. In this configuration the taggant material does not enter in contact with the formation or liquid phase. Core-shell nanoparticles can be fabricated either by solution chemistry route or by vapor deposition route. A non-limiting example of a core-shell nano-sized particle is the one where a magnetic core is surrounded by MgO. The magnetic core also eases separation of nanoparticles from the suspension by an applied magnetic field. In this alternative, non-restrictive embodiment, the core-coating nanoparticles will behave as regular MgO nanoparticles in terms of fine adhesion. The magnetic core may be used to separate the particles from the suspension for analysis or for direct identification, for instance if particles with the magnetic core are placed in one zone and particles without the magnetic core are placed in another zone.

In other non-limiting embodiments, the nanoparticles may be tagged post-manufacture such as by coating them with a coating material that includes the taggant. Any suitable coating technique may be used to coat the nanoparticles such as without limitation, molten salt, plasma coating, chemical vapor deposition (CVD), physical vapor deposition (PVD), chemical and electrochemical techniques such as without limitation electroless plating, and the like. In one non-limiting example coating may take place by electroless plating using one or more easily reducible metals. In another example, a very thin film of the taggant material may be deposited on the nano-sized particles. Such deposition may take place by chemical vapor deposition processes (CVD) or physical vapor deposition (PVD) in which the precursors for the taggant are supplied from the vapor phase, and the nanoparticles are in a fluidized state. In order to assist the activation of the precursors during chemical vapor deposition, the process deposition process may make use of a plasma.

Regardless of how the taggant is coated or deposited on the dual-function nanoparticles, the coating may be a low density or partial coating, a complete coating encapsulating individual nanoparticles, or a combination of partial and completely coated nanoparticles. In yet other embodiments coated dual-function nanoparticles, whether partially and/or completely coated, are mixed with nanoparticles that are not coated. In a specific, non-limiting example, from about 0.5% to about 10% by weight of the total nanoparticles added to proppant or within a fluid such as a treatment fluid are coated with a taggant.

In another non-limiting embodiment, the dual-function nanoparticles may have a particle size of from about 1 nanometer independently up to about 1000 nanometers regardless of the presence or absence of taggant. In another non-limiting embodiment, the particle size may range from about 10 nanometers independently up to about 500 nanometers. In another non-restrictive version, the dual-function particles may have a mean particle size of about 400 nm or less, alternatively about 300 nm or less, and in another possible version about 200 nm or less, alternatively 100 nm or less.

As has been previously mentioned, dual-function nano-sized particles may be disposed on carrier particles such as proppant, gravel, or the like. In other embodiments, however, dual-function nano-particles may be pumped downhole in a base fluid or a carrier fluid as a particulate additive, where the base fluid or carrier fluid also contains proppant or gravel particles. The amount of dual-function nano-sized particles in the base or carrier fluid may range from about 20 to about 500 pounds per thousand gallons (pptg) (about 2.4 to about 60 kg/1000 liters). Alternatively, the lower threshold of the proportion range may be about 50 pptg (about 6 kg/1000 liters), while the upper threshold of proportion of the particles may independently be about 300 pptg (about 36 kg/1000 liters).

The base fluid may be water-based, alcohol-based or oil-based, but in many embodiments the base fluid is expected to be water-based. Non-limiting examples of suitable water-based fluids include, but are not restricted to, EMERALD FRAQ® aqueous fluid containing a crosslinked polymer and DIAMOND FRAQ™ aqueous fluid containing a viscoelastic surfactant (VES), both available from Baker Hughes Incorporated. In another non-restrictive version, the base fluid may be foamed.

The base fluid or aqueous-based fluid may be a brine. In non-limiting embodiments, the brine may be prepared using salts including, but not necessarily limited to, NaCl, KCl, $CaCl_2$, $MgCl_2$, $NH_4Cl$, $CaBr_2$, NaBr, sodium formate, potassium formate, and other commonly used stimulation and completion brine salts. The concentration of the salts to prepare the brines may be from about 0.5% by weight of water up to near saturation for a given salt in fresh water, such as 10%, 20%, 30% and higher percent salt by weight of water. The brine may be a combination of one or more of the mentioned salts, such as a brine prepared using NaCl and $CaCl_2$ or NaCl, $CaCl_2$, and $CaBr_2$ as non-limiting examples.

While the fluids herein are sometimes described typically herein as having use in fracturing fluids, it is expected that they will find utility in gravel pack fluids, displacement fluids and the like. In the case where the carrier fluid is an acidizing fluid, it also contains an acid. In the case where the carrier fluid is also a gravel pack fluid, the fluid also contains gravel consistent with industry practice.

In hydraulic fracturing applications, propping agents, or proppants are typically added to the base fluid. The propping agents are normally used in concentrations between about 1 to 14 pounds per gallon (120-1700 kg/m$^3$) of fracturing fluid composition, but higher or lower concentrations may be used as the fracture design requires. The proppant may carry or have disposed thereon dual function nanoparticles.

In addition to proppant, dual-function nanoparticles may be carried by or disposed on gravel, solid particles, or the like. These dual function, nano-particle carrier particles may be any particulate matter suitable for its intended purpose, for example as a screen or proppant, etc. Suitable materials include, but are not necessarily limited to sand (e.g. quartz sand grains), sintered bauxite, bauxite grains, walnut shell fragments, aluminum pellets, nylon pellets, sized calcium carbonate, other sized salts, glass and/or ceramic beads, and the like, and combinations thereof. In a non-limiting embodiment, the proppant particles may be 20/40 mesh ceramic proppants. These solids may also be used in a fluid loss control application.

In a non-limiting version, dual-function nanoparticles may be coated on carrier particles such as a proppant or sand. In one embodiment, a fines control agent, which includes a mixture of a coating agent and the dual-function nanoparticles, may at least partially coat a proppant (or other suitable carrier particle) to fixate formation fines within a proppant pack or other porous media, or inhibit or prevent fines from migrating or moving within the subterranean formation. In another non-limiting embodiment, if gravel is at least partially coated with the fines control agent then the formation fines may be fixated within the gravel pack, or they may be inhibited from migrating or moving within the subterranean formation. In these non-restrictive examples, if the proppant pack or gravel pack fails, the carrier particles together with the dual-function nanoparticles may flow back into the wellbore.

It is expected that at least a portion of carrier particles such as proppant may be "pre-coated" with the fines control agent; for instance, a select portion of the proppant may be pre-coated before the job. As a non-restrictive example, pre-coating may be performed at the manufacturing site of the dry proppant or elsewhere. In one non-restrictive version, the fines control agent may be possibly sprayed onto the dry proppant (or other carrier particles) before the proppant is placed in an aqueous treatment fluid. In another non-limiting embodiment, the fines control agent may be coated on proppant or sand during placement downhole.

In addition to one or more embodiments of dual-function nanoparticles, the fines control agent may also include a coating agent. Suitable coating agents include, but are not necessarily limited to, mineral oil or other suitable hydrocarbon. Specific, non-limiting examples of suitable mineral oils include ConocoPhillips Pure Performance® Base Oil, such as 225N and 600N oils. In some embodiments, a fines control agent may include dual-function nanoparticles in the coating agent oil, for instance about 15 wt % nano-sized, tagged MgO particles in the 600N mineral oil. This type of fines control product may be added to an aqueous base fluid in a relatively small amount, in one non-limiting embodiment, from about 5 to about 100 gallons per thousand gallons (gptg). (Equivalent SI proportions may be any convenient volume with the same value, e.g. about 5 to about 100 liters per thousand liters or about 5 to about 100 m$^3$ per thousand m$^3$.) During mixing, the fines control product (i.e. the dual-function nanoparticles in oil) may plate out on or at least partially coat the carrier particles in the base fluid, such as proppant particles. That is, since the base fluid is aqueous, the hydrophobic oil will be repulsed by the water and will coat the carrier particles (e.g. proppant). How much coating of the carrier particles that occurs is concentration dependant, based on both the amount of carrier particles used and the amount of fines control product used. In a non-limiting example the fines control product may additionally have a surfactant present, such as an oil-wetting surfactant like sorbitan monooleate Span 80 from Uniqema), to improve and/or enhance the oil-wetting of the proppant particles by the fines control product. In another non-limiting example the presence of a surfactant may preferentially reduce the thickness of the 600N mineral oil layer on proppant particles. Reduced oil layer thickness may enhance dual-function nanoparticle exposure on proppant particles. Other agents besides Span 80 may be employed to optimize the oil coating or wetting on proppant particles, agents such as: sorbitan esters, ethoxylated sorbitan esters, ethoxylated alcohols, ethoxylated alkyl-phenols, alkyl-dicarboxylics, sulfosuccinates, phospholipids, alkyl-amines, quaternary amines, alkyl-siloxanes, and the like. It is not necessary that a resin be used as a coating agent or binder, and in one non-limiting embodiment, no resin is used.

Mineral oil may be a particularly suitable coating agent for at least two reasons. First, mineral oil and like substances may have an affinity to coat carrier particles such as proppant particles as contrasted with remaining as oil droplets containing dual-function nanoparticles as a phase internal to the water-based fluid. It is believed that the most stable configuration for the fines control agent once placed in an aqueous treatment fluid is to "plate out" or coat or at least partially coat the carrier particles. Second, a high molecular weight mineral oil coating agent may not disturb the fluid properties of an aqueous fluid containing a polymer gelling agent or a VES gelling agent, and thus it may be ideal for depositing the dual-function nanoparticles onto the proppant without disturbing aqueous fluid properties.

It is theorized that the dual-function nanoparticles remain on the proppant particles primarily by electrostatic and other charges between the nanoparticle and proppant particle surfaces, however, other attractions or coupling forces may exist to initially and over the long-term keep the nanoparticles coated on the proppant particles. The inventors, however, do not want to be limited to any particular theory. It is suspected that in most conditions the oil carrier fluid only assists the initial coating process of the dual-function nanoparticles onto the proppant particles. Other agents, however, may be added to the oil carrier fluid to further enhance initial and/or long-term nanoparticle attraction to particles including, without limitation, quartz, glass, ceramic and other materials known in the proppant art. Additionally, the surface of the proppant, or a select amount of proppant, may be treated with agents that may improve the overall attraction of the dual-function nanoparticles to proppant or other carrier particles.

In the foregoing specification, it will be evident that various modifications and changes may be made thereto without departing from the broader spirit or scope of the invention as set forth in the appended claims. Accordingly, the specification is to be regarded in an illustrative rather than a restrictive sense. For example, specific combinations of alkaline earth metal oxides, alkaline earth metal hydroxides, transition metal oxides, transition metal hydroxides, post-transition metal oxides, post-transition metal hydroxides, piezoelectric crystals, and pyroelectric crystals, of various sizes; brines; base fluids; proppants (sand, ceramic or glass beads, gravel); coating agents (oils); taggants (including specific combinations of taggants and taggant-primary component combinations) and other components falling within the claimed parameters, but not specifically identified or tried in a particular composition or method, are anticipated to be within the scope of this invention.

The present invention may suitably comprise, consist or consist essentially of the elements disclosed and may be practiced in the absence of an element not disclosed. For instance, the coated carrier particles may consist of or consist essentially of the carrier particles, nanoparticles and a taggant, as further defined in the claims. Alternatively, the drilling fluid may consist of or consist essentially of the base fluid, the nanoparticles and a surfactant, as further defined in the claims. In each of these examples, the drilling fluid may contain conventional additives.

The words "comprising" and "comprises" as used throughout the claims is to interpreted "including but not limited to".

What is claimed is:

1. Coated carrier particles comprising:
    carrier particles selected from the group consisting of sand, gravel, ceramic beads, glass beads, and combinations thereof, the carrier particles being directly coated with nanoparticles having a mean particle size of 1000 nm or less, the nanoparticles consisting of:
        a primary component selected from the group consisting of alkaline earth metal oxides, alkaline earth metal hydroxides, transition metal oxides, transition metal hydroxides, post-transition metal oxides, post-transition metal hydroxides, piezoelectric crystals, pyroelectric crystals, and mixtures thereof; and
        a taggant disposed on the nanoparticles selected from the group consisting of alkaline earth metals, transition metals, post-transition metals, lanthanoids, and mixtures thereof; where the taggant is selected to be distinguishable from the primary component.

2. The coated carrier particles of claim 1 where the primary component alkaline earth metal is selected from the group consisting of magnesium, calcium, strontium, and barium; where the primary component transition metal is selected from the group consisting of titanium and zinc; where the primary component post-transition metal is aluminum; and mixtures thereof.

3. The coated carrier particles of claim 1 where
    the taggant alkaline earth metal is selected from the group consisting of strontium, barium, and mixtures thereof;
    the taggant transition metal is selected from the group consisting of scandium, yttrium, titanium, zirconium, hafnium, vanadium, niobium, tantalum, chromium, molybdenum, tungsten, manganese, rhenium, iron, ruthenium, osmium, cobalt, rhodium, iridium, nickel, palladium, platinum, copper, silver, gold, zinc, cadmium, and mixtures thereof; the taggant post transition metal is selected from the group consisting of aluminum, gallium, indium, thallium, tin, lead, bismuth, germanium, arsenic, antimony, selenium, tellurium, and mixtures thereof; the taggant lanthanoid is selected from the group consisting of lanthanum, cerium, praseodymium, neodymium, promethium, samarium, europium, gadolinium, terbium, dysprosium, holmium, erbium, thulium, ytterbium, lutetium; and mixtures thereof.

4. The coated carrier particles of claim 1 where the taggant is integral with the primary component.

5. The coated carrier particles of claim 4 where the taggant forms a core of the primary component.

6. The coated carrier particles of claim 5 where the core is magnetic.

7. The coated carrier particles of claim 1 where the taggant is in elemental form.

8. The coated carrier particles of claim 1 where the taggant is in compound form, the compound selected from the group consisting of fluoride, chloride, bromide, nitrate, nitride, iodate, oxide, hydroxide, carbonate, sulfate, sulfide, phosphate, silicate, alkoxide, an organic acid, and combinations thereof.

* * * * *